United States Patent
Iyer et al.

(10) Patent No.: US 10,384,510 B2
(45) Date of Patent: Aug. 20, 2019

(54) HVAC VARIANT FOR AUTONOMOUS VEHICLE

(71) Applicant: Hanon Systems, Daejeon (KR)

(72) Inventors: Jayanthi R. Iyer, Northville, MI (US); Eric Haupt, Livonia, MI (US); Dennis Vermette, Westland, MI (US)

(73) Assignee: HANON SYSTEMS, Daejeon (KR)

( * ) Notice: Subject to any disclaimer, the term of this patent is extended or adjusted under 35 U.S.C. 154(b) by 110 days.

(21) Appl. No.: 15/711,360

(22) Filed: Sep. 21, 2017

(65) Prior Publication Data
US 2018/0141405 A1    May 24, 2018

Related U.S. Application Data

(60) Provisional application No. 62/426,161, filed on Nov. 23, 2016.

(51) Int. Cl.
*B60H 1/00* (2006.01)
*F25D 21/00* (2006.01)

(52) U.S. Cl.
CPC ..... *B60H 1/00064* (2013.01); *B60H 1/00528* (2013.01); *B60H 1/0005* (2013.01); *B60H 1/00678* (2013.01); *B60H 2001/002* (2013.01); *B60H 2001/00135* (2013.01); *F25D 21/002* (2013.01)

(58) Field of Classification Search
CPC ............ B60H 1/00064; B60H 1/00528; B60H 1/00564; B60H 1/0005; B60H 1/00678; B60H 1/00685; B60H 2001/002; B60H 2001/00135; F25D 21/002
USPC ................................................... 165/47, 203
See application file for complete search history.

(56) References Cited

U.S. PATENT DOCUMENTS

| | | | |
|---|---|---|---|
| 2002/0157811 A1* | 10/2002 | Vincent ................ | B60H 1/0005 165/59 |
| 2011/0005720 A1* | 1/2011 | Seto .................... | B60H 1/00064 165/71 |
| 2017/0106722 A1 | 4/2017 | Nolta et al. | |
| 2017/0320370 A1* | 11/2017 | Aizawa .............. | B60H 1/00514 |

FOREIGN PATENT DOCUMENTS

| | | | |
|---|---|---|---|
| KR | 20130053680 A | 5/2013 | |
| KR | 20140055246 A | 5/2014 | |
| KR | 20160111576 A | 9/2016 | |

* cited by examiner

*Primary Examiner* — Joel M Attey
(74) *Attorney, Agent, or Firm* — Shumaker, Loop & Kendrick, LLP; James D. Miller (57) ABSTRACT

An air handling system for a vehicle comprises a conditioning section for controlling a temperature of a flow of air, a mixing section disposed downstream of the conditioning section with respect to a direction of the flow of the air, and a delivery section disposed downstream of the mixing section with respect to the direction of the flow of the air. The delivery section includes a first chamber, a second chamber, and a third chamber. A dividing plate separates each of the second chamber and the third chamber into a first side portion to a first side of the dividing plate and a second side portion to an opposing second side of the dividing plate. The second side portion of the third chamber is configured to primarily direct the flow of the air towards a rear seat area of the vehicle.

18 Claims, 7 Drawing Sheets

HVAC VARIANT FOR AUTONOMOUS VEHICLE

CROSS-REFERENCE TO RELATED APPLICATION

This patent application claims priority to U.S. Provisional Patent Application Ser. No. 62/426,161, filed Nov. 23, 2016, the entire disclosure of which is hereby incorporated herein by reference.

FIELD OF THE INVENTION

The invention relates generally to a heating, ventilating, and air conditioning (HVAC) air handling system for a motor vehicle, and more particularly, to an HVAC air handling system for an autonomous motor vehicle wherein conventional driver controls are not desired in the passenger compartment.

BACKGROUND

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air handling system. The air handling system conditions air flowing therethrough and distributes the conditioned air throughout the passenger compartment.

The air handling system commonly employs a housing having a plurality of conduits and doors for selectively controlling a flow of air to various vents within the passenger compartment of the vehicle, depending on an operating mode selected by a vehicle occupant. Each operating mode includes a preselected percentage of the air originating from a mixing chamber delivered to each of the corresponding vents associated with the selected operating mode. The vents may include panel vents, console vents, front floor vents, rear floor vents, windshield defrost vents, and side window defrost vents, for example.

In conventional motor vehicles, the air handling system is generally configured to provide a majority of the air to the front passengers of the vehicle, as the front driver seat and the front passenger seat are the most commonly occupied spaces in the vehicle. However, in certain situations, it has become desirable to provide a majority of the air to the rear seat area of the vehicle. For example, in autonomous vehicles, passengers may only sit in the rear seats of the vehicle, while the front seats of the vehicle remain unoccupied. Similarly, in chauffeured vehicles, the passengers in the rear seats of the vehicle may be given priority with respect to passenger comfort over the driver of the chauffeured vehicle.

Although some vehicles are designed to be strictly autonomous, and the respective air handling systems are designed to account for rear-seated passengers, vehicle manufacturers have expressed an interest in adapting conventional human-driven vehicles to be autonomous, with only minimal modification to current vehicle designs.

Accordingly, there exists a need in the art for an HVAC air handling system configured to provide an increased amount of air to a rear seat area of the passenger compartment, wherein the air handling system is interchangeable with an air handling system configured to provide a majority of air to the front seat area of the passenger compartment.

SUMMARY OF THE INVENTION

Compatible and attuned with the present invention, an air handling system having an increased distribution of air to a rear seat area of the vehicle has surprisingly been discovered.

In one embodiment of the invention, an air handling system for a vehicle comprises a conditioning section for controlling a temperature of a flow of air, a mixing section disposed downstream of the conditioning section with respect to a direction of the flow of the air, and a delivery section disposed downstream of the mixing section with respect to the direction of the flow of the air. The delivery section includes a first chamber, a second chamber, and a third chamber. A dividing plate separates each of the second chamber and the third chamber into a first side portion to a first side of the dividing plate and a second side portion to an opposing second side of the dividing plate. The second side portion of the third chamber is configured to primarily direct the flow of the air towards a rear seat area of the vehicle.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-7 illustrate an air-handling system 10 of a heating, ventilating, and air conditioning (HVAC) system or climate control system for a vehicle (not shown) according to an embodiment of the disclosure. As used herein, the term air can refer to fluid in a gaseous state, fluid in a liquid state, or any combination thereof. The air-handling system 10 typically provides heating, ventilation, and air conditioning for a passenger compartment (not shown) of the vehicle.

Figure 1:
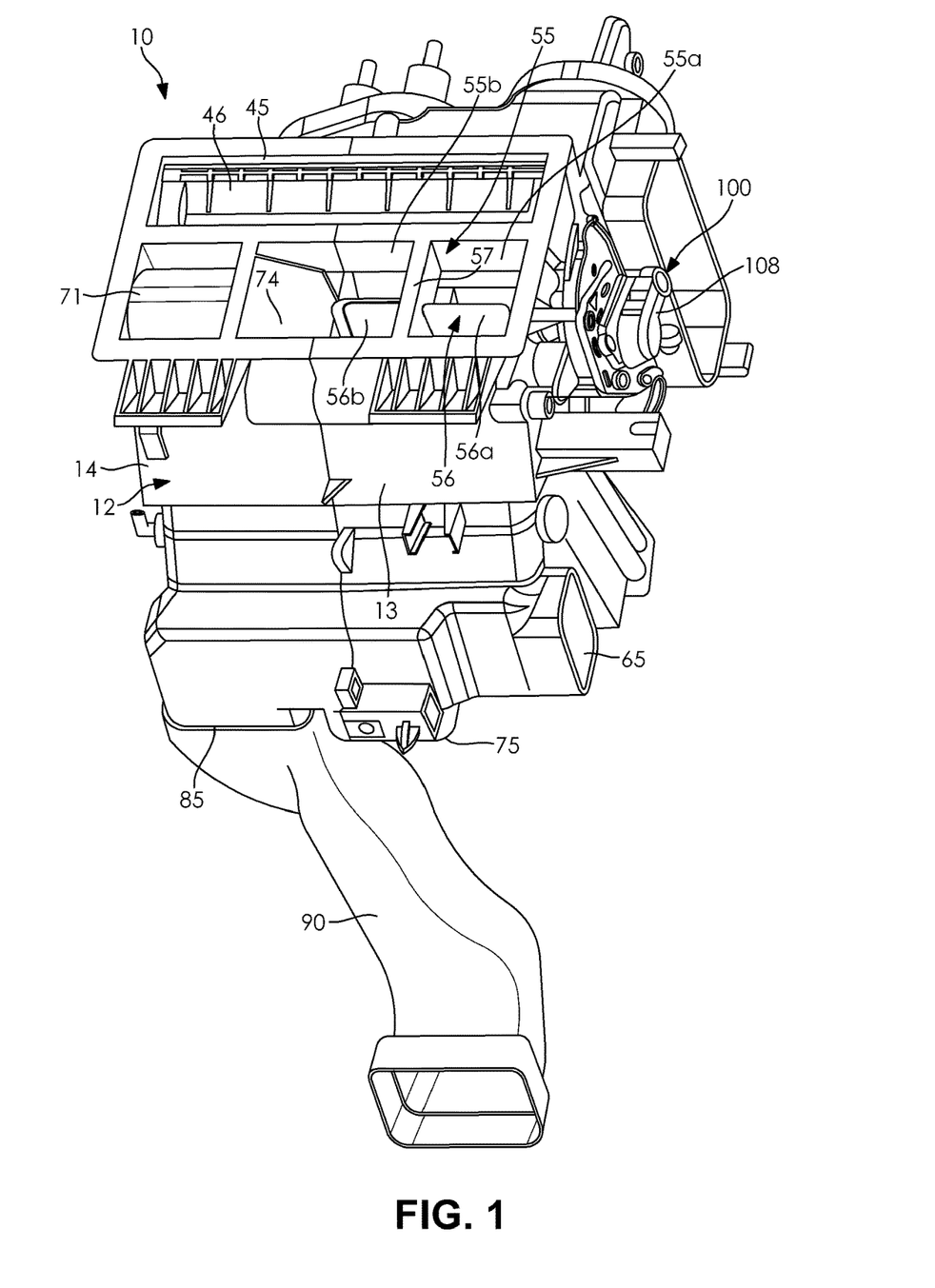
FIG. 1 is a top perspective view of an air handling system according to an embodiment of the present invention.

The air-handling system 10 includes a hollow main housing 12. The main housing 12 may be formed by the cooperation of a first housing shell 13 and a second housing shell 14. The first and second housing shells 13, 14 may interface with each other along peripheral regions thereof to form the hollow main housing 12. As shown in FIG. 1, the interface between the first and second housing shells 13, 14 may be substantially planar. The main housing 12 may be formed from plastic, but other materials can be used, as desired. In other embodiments, the main housing 12 may be formed by the cooperation of three or more separately formed components or housing portions, as desired.

Figure 3:
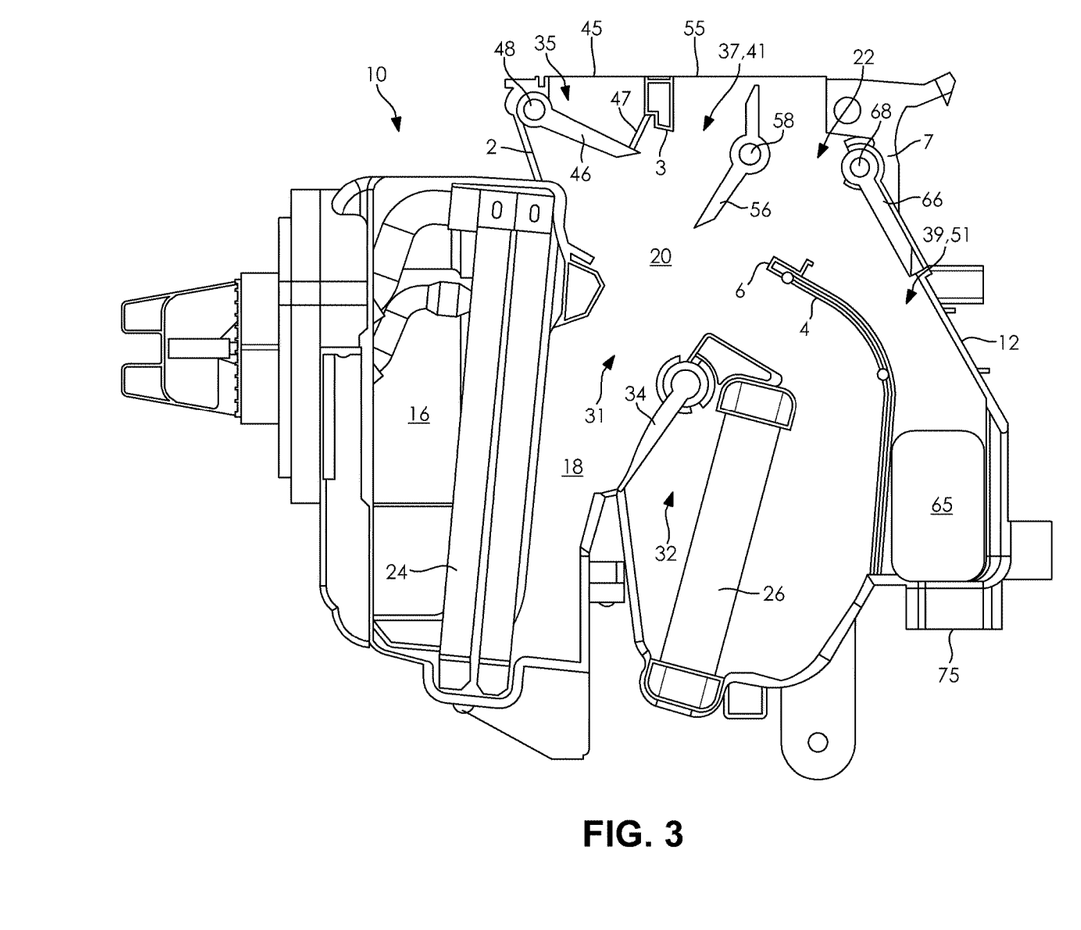
FIG. 3 is a cross-sectional elevation view of the air handling system of FIGS. 1 and 2, taken along section line 3-3 of FIG. 2.
Figure 4:
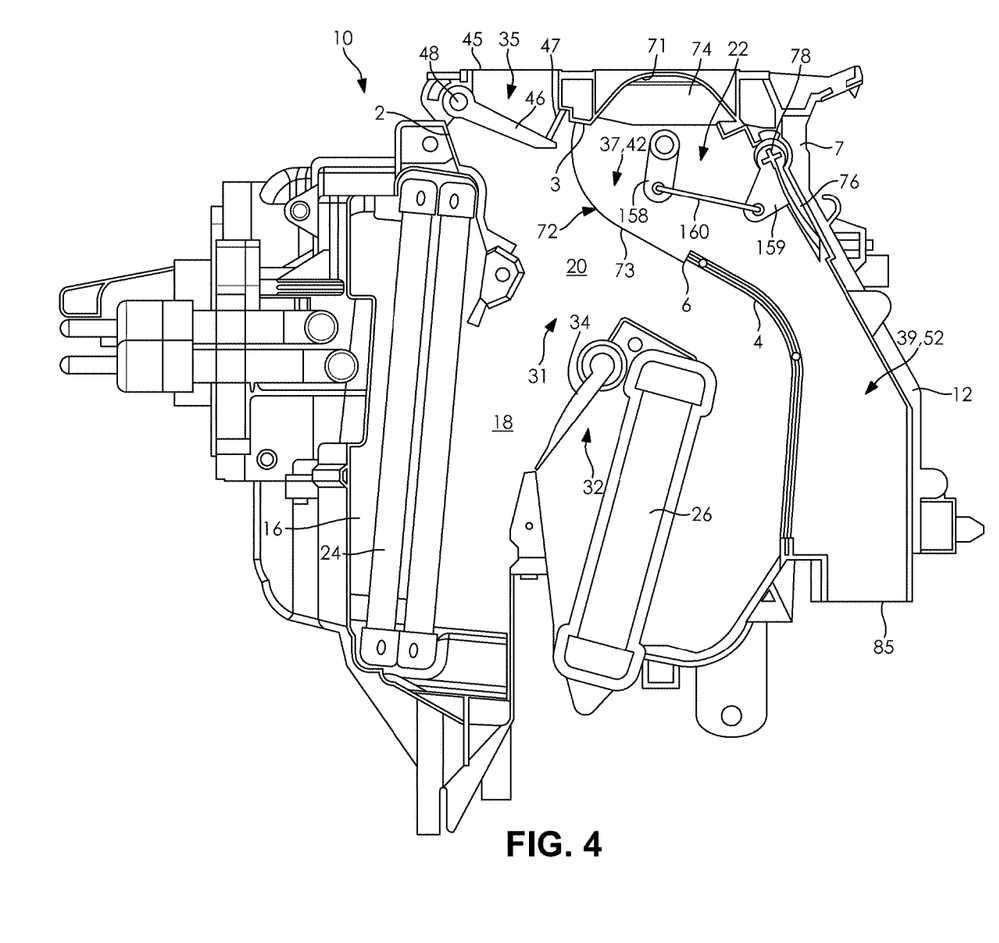
FIG. 4 is a cross-sectional elevation view of the air handling system of FIGS. 1 and 2, taken along section line 4-4 of FIG. 2.

As shown in FIGS. 3 and 4, the air handling system 10 includes an inlet section 16, a conditioning section 18, a mixing section 20, and a delivery section 22. The inlet section 16 receives a supply of air and may include a blower or fan (not shown) for causing the supply of the air to flow to the conditioning section 18. The supply of the air can be provided from outside of the vehicle, recirculated from the passenger compartment of the vehicle, or a mixture of the two, for example. If desired, a filter (not shown) can be provided upstream or downstream of the inlet section 16 to filter debris or contaminants carried by the supply of air.

The conditioning section 18 may include an evaporator core 24, a heater core 26, and a temperature door 34 disposed therein. The evaporator core 24 and the heater core 26 may be in communication with a source of cooled fluid (not shown) and a source of heated fluid (not shown), respectively. The evaporator core 24 may form a portion of a primary refrigerant circuit of the air conditioning system associated with the air-handling system 10. The evaporator core 24 is configured to exchange heat energy between the air flowing through the main housing 12 and the cooled fluid flowing through the evaporator core 24 to cool and/or dehumidify the air. Although described as an evaporator core 24, it should be understood that any form of cooling device in heat exchange relationship with any device or system of the motor vehicle may be employed for use with the air-handling system 10 without departing from the scope of the present invention.

The heater core 26 may form a radiator associated with a coolant circuit used to cool an engine of the motor vehicle, wherein the heater core 26 is further configured to exchange heat energy between the air flowing through the main housing 12 and a coolant circulated through the coolant circuit to heat the air. Alternatively, the heater core 26 may be in heat exchange relationship with a fluid used to cool a battery or other heat producing device associated with the motor vehicle or the heater core 26 may be a heating device configured to produce heat using an electrical energy source. It should be understood that any form of heating device suitable for heating a flow of air therethrough may be used in place of the heater core 26 without departing from the scope of the present invention.

The evaporator core 24 is disposed in the conditioning section 18 immediately downstream of the inlet section 16. As shown, the evaporator core 24 extends across an entirety of a flow area at the inlet of the conditioning section 18 to cause the entirety of the air flowing to the conditioning section 18 to pass through the evaporator core 24, thereby cooling and/or dehumidifying the entirety of the air from the inlet section 16 flowing through the conditioning section 18.

After flowing through the evaporator core 24, the flow of the air encounters a temperature door 34 pivotally coupled to the main housing 12 and configured to direct the flow of air through either one or both of a cold air passageway 31 and a warm air passageway 32. The temperature door 34 may be positioned in a first position, as shown in FIGS. 3 and 4, wherein the temperature door 34 is pivoted to a position blocking the flow of the air through the warm air passageway 32. When the temperature door 34 is in the first position, the entirety of the air flowing from the inlet section 16 is directed through the opened cold air passageway 31 immediately after flowing through the evaporator core 24. The temperature door 34 may alternatively be positioned in a second position (not shown) wherein the temperature door 34 is pivoted to a position blocking the flow of the air through the cold air passageway 31. When the temperature door 34 is in the second position, the entirety of the air is directed through the warm air passageway 32 immediately after flowing through the heater core 26.

The temperature door 34 may alternatively be pivoted to a plurality of positions intermediate the first position and the second position. When in one of the intermediate positions, a first partial air flow of the air flowing from the inlet section 16 may flow through the cold air passageway 31 and past the temperature door 34, while a second partial air flow of the air flowing from the inlet section 16 may flow through the warm air passageway 32, including passing through the heater core 26 and past the temperature door 34. The first partial air flow and the second partial air flow are then recombined in the mixing section 20.

FIGS. 3 and 4 illustrate one representative arrangement of the evaporator core 24, the heater core 26, and the temperature door 34. However, it is understood by one skilled in the art that various different arrangements may be utilized without departing from the scope of the present invention, so long as the temperature of the air is controlled in accordance in the desired settings of the passenger within the passenger compartment of the motor vehicle. For example, the cold air passageway 31 may include one or more control doors downstream of the evaporator core 24 and the warm air passageway 32 may similarly include one or more control doors disposed upstream or downstream of the heater core 26. The type and form of temperature door utilized in either of the cold air passageway 31 or the warm air passageway 32 may also vary from the disclosed rotary temperature door 34. The temperature door may for example include a sliding or a translating structure for varying a cross-sectional flow area through one or both of the cold air passageway 31 and the warm air passageway 32 to control the temperature of the air entering the mixing section 20.

The delivery section 22 of the main housing 12 is formed immediately adjacent the mixing section 20 and includes a first chamber 35 formed in a front portion of the main housing 12, a second chamber 37 formed adjacent the first chamber 35 in an intermediate portion of the main housing 12, and a third chamber 39 formed in a rear portion of the main housing 12 adjacent the second chamber 37. When the air handling system 10 is installed into the motor vehicle, the first chamber 35 may represent a front chamber disposed towards a front end of the motor vehicle, the third chamber 39 may represent a rear chamber disposed towards a rear end of the motor vehicle, and the second chamber 37 may represent an intermediate chamber disposed between the front chamber and the rear chamber.

An inlet into the first chamber 35 is generally defined between a wall 2 forming a portion of the main housing 12 and a first dividing wall 3 separating the first chamber 35 from the second chamber 37. The first chamber 35 includes a first outlet 45 disposed at a downstream end thereof with respect to a flow of the air therethrough. The first outlet 45 is fluidly coupled to one or more defrost vents (not shown) or side window defrost vents (not shown) configured to deliver the air to various different windows of the vehicle. The windows may include the front windshield, the rear window, and any other windows of the vehicle. The air handling system 10 may include one or more conduits (not shown) extending from the first outlet 45 for delivering the air to each of the defrost vents or each of the demist vents associated with the first outlet 45.

The first chamber 35 further includes a first control door 46 for selectively controlling the flow of the air delivered to the first outlet 45 and subsequently each of the defrost vents or each of the demist vents in fluid communication with the first outlet 45. The first control door 46 is pivotable about a pivot axis 48 disposed adjacent the wall 2 for adjusting the first control door 46 between a first position and a second position. The first position, which is illustrated in FIGS. 3 and 4, includes the first control door 46 pivoted to a position wherein the first control door 46 extends across the first chamber 35 for minimizing an amount of the flow of the air delivered to the first outlet 45 from the mixing section 20. The first position may not include a full blockage of the flow of the air past the first control door 46 to allow for a bleed of air to maintain the windows of the motor vehicle in a de-fogged or de-misted state regardless of the operating mode of the air handling system 10 selected by an occupant of the passenger compartment. The second position (not shown) includes the first control door 46 pivoted to a position wherein a maximized amount of the flow of the air is allowed to flow past the first control door 46 from the mixing section 20 and through the first outlet 45. The first control door 46 is further adjustable to a plurality of positions intermediate the first position and the second position for selectively controlling the flow of the air delivered to the first outlet 45 and subsequently to the various window vents of the motor vehicle.

Figure 2:
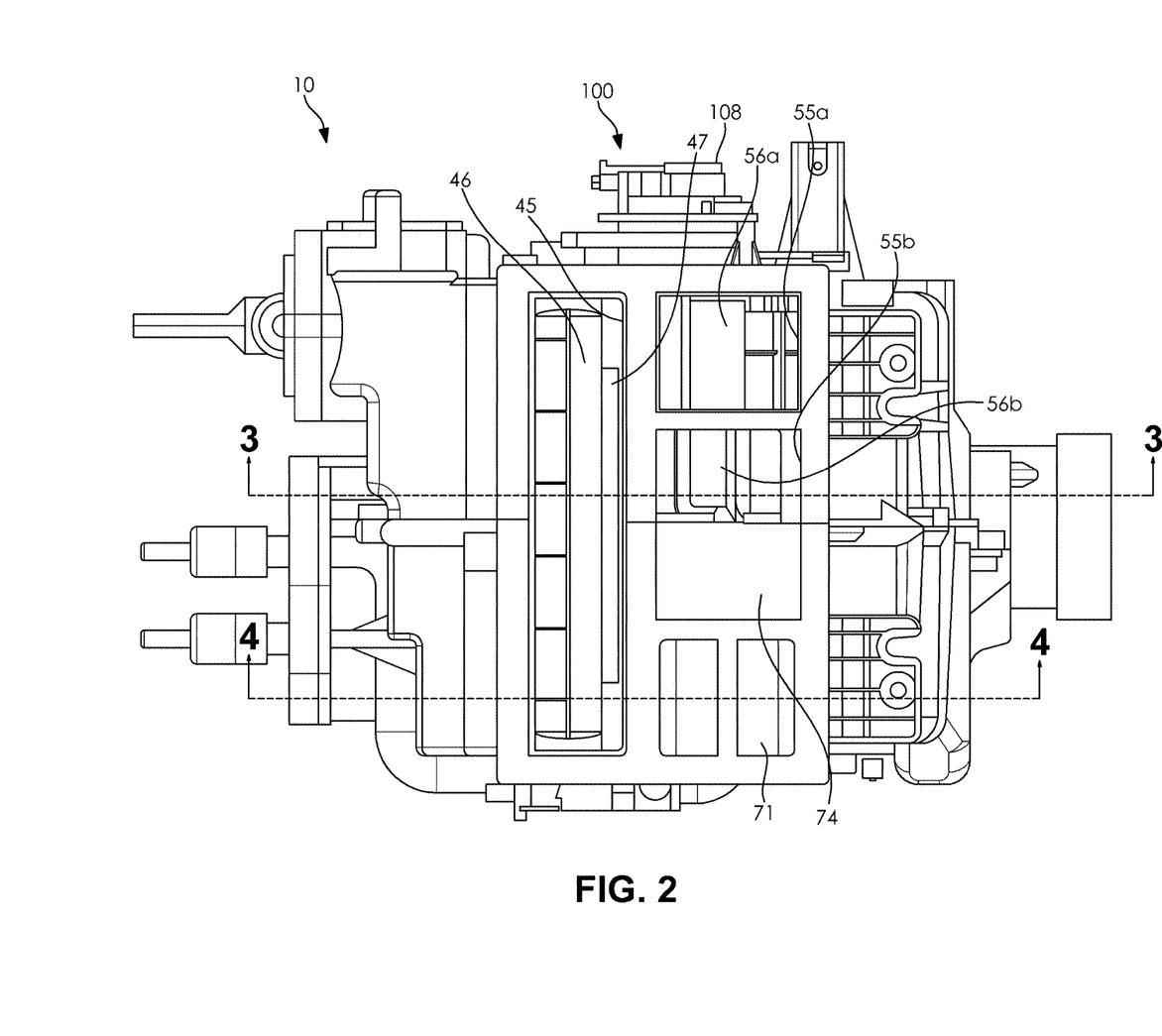
FIG. 2 is a top plan view of the air handling system of FIG. 1.

In the embodiment shown, the first control door 46 is a single paneled door formed to a common side of the pivot axis 48 thereof. The first control door 46 further includes a spacer 47 extending transversely from a side of the first control door 46 spaced from the pivot axis 48 thereof. The spacer 47 has a length less than a length of the associated side of the first control door 46 to cause the spacer 47 to be indented relative to the ends of the of the first control door 46, as best shown in FIG. 2. The indenting of the spacer 47 allows fluid flow paths to be formed on either side of the spacer 47, even when the first control door 46 is pivoted to the first position for substantially closing off flow to the first outlet 45. The fluid flow paths may be present to allow for a bleed of the flow of the air to be continuously distributed to the windows of the motor vehicle to prevent fogging or misting thereof, as mentioned hereinabove. The bleed condition of the flow of the air may include a distal surface of the spacer 47 abutting the first dividing wall 3 separating the first chamber 35 from the second chamber 37 to allow the flow paths formed to either side of the spacer 47 to remain open while minimizing the flow of the air past the first control door 46.

Alternative configurations of the first control door 46 may be utilized without departing from the scope of the present invention, including the use of a door having multiple panels or an axis of rotation spaced from the position shown in FIGS. 3 and 4. The main housing 12 may further include cooperating structure formed on the first dividing wall 3 for controlling the flow of the air past the first control door 46 or for minimizing an incidence of noise generation that may be caused by the flow of the air when passing by the first control door 46. It is further understood that various sliding structures and other flow control mechanisms may be used in place of the pivotable first control door 46 without departing from the scope of the present invention.

A second dividing wall 4 separates a rearward portion of the conditioning section 20 from the third chamber 39. An inlet into the second chamber 37 is generally formed between an end 6 of the second dividing wall 4 and the first dividing wall 3. An inlet into the third chamber 39 is generally formed between the end 6 of the second dividing wall 4 and a wall 7 forming a portion of the main housing 12 on a side of the second chamber 37 opposite the first chamber 35.

Figure 5:
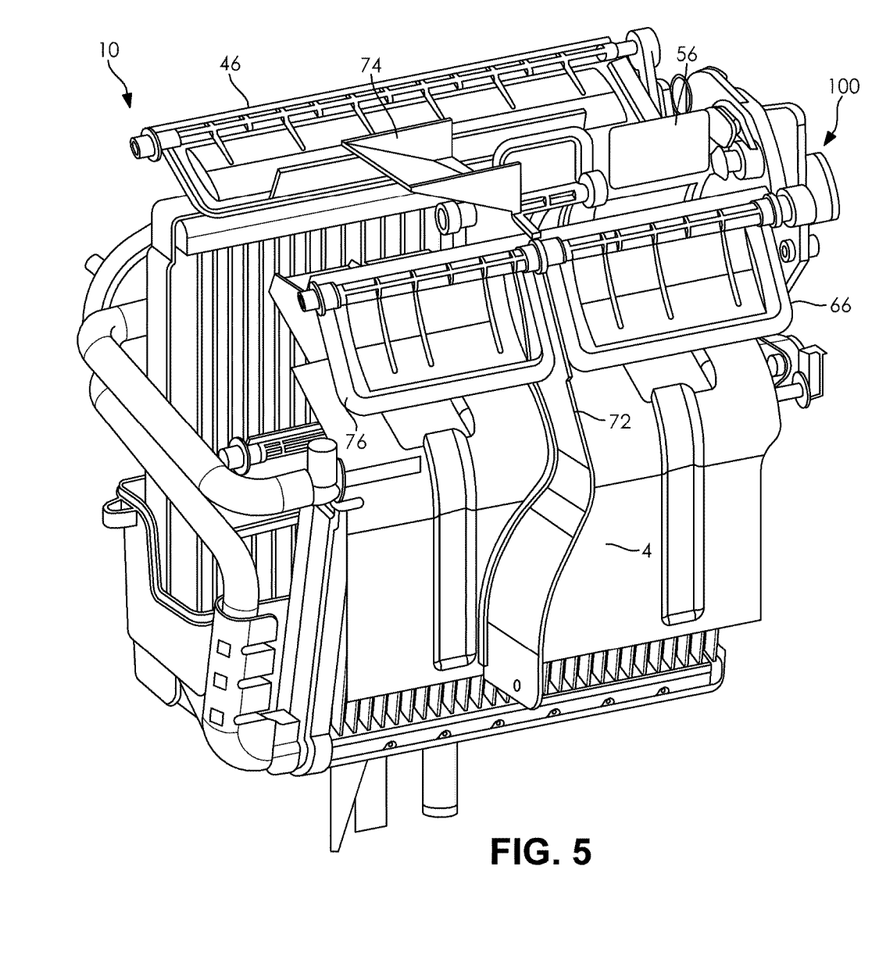
FIG. 5 is a top perspective view of the air handling system of FIGS. 1-4, wherein a main housing of the air handling system has been removed for illustrative purposes.

A dividing plate 72 extends through the second chamber 37 and the third chamber 39. The dividing plate 72 divides the second chamber 37 into a first side portion 41 formed to a first side of the dividing plate 72 and a second side portion 42 formed to an opposing second side of the dividing plate 72. The dividing plate 72 also divides the third chamber 39 into a first side portion 51 formed to the first side of the dividing plate 72 and a second side portion 52 formed to the opposing second side of the dividing plate 72. With reference to FIG. 5, which includes the main housing 12 removed to expose interior portions of the air handling system 10, the dividing plate 72 extends transversely from the second dividing wall 4. An uppermost portion of the dividing plate 72 disposed within the second chamber 37 may be disposed along substantially the same plane as the plane defining the intersection of the first housing shell 13 and the second housing shell 14 of the main housing 12.

FIG. 3 is a cross-sectional view of the air handling system 10 taken through a plane illustrating the first side portion 41 of the second chamber 37 and the first side portion 51 of the third chamber 39. FIG. 4 is cross-sectional view of the air handling system 10 taken through a plane illustrating the second side portion 42 of the second chamber 37 and the second side portion 52 of the third chamber 39. As best shown in FIG. 4, a leading edge 73 of the dividing plate 72 extends to a boundary formed between the mixing section 20 and the second chamber 37 of the delivery section 22. Thus, the flow of the air exiting the mixing section 20 first enters the second chamber 37 by flowing to either side of the edge 73 of the dividing plate 72. A position of the edge 73 in a lateral direction of the dividing plate 72 extending perpendicular to each major surface of the dividing plate 72 may be such that approximately half of the mixing section 20 is disposed to either side of the edge 73 of the dividing plate 72 to cause the air exiting the mixing section 20 to be divided substantially equally between the first side portion 41 and the second side portion 42 of the second chamber 37. The dividing plate 72 may alternatively be positioned in the lateral direction to cause an increased percentage of the air exiting the mixing section 20 to be directed to one of the first side portion 41 or the second side portion 42 of the second chamber 37, as desired.

The first side portion 41 of the second chamber 37 includes a second outlet 55 formed downstream of the edge 73 of the dividing plate 72 and along substantially the same plane as the first outlet 45 of the first chamber 35. As shown in FIG. 1, the second outlet 55 may include a divider 57 for dividing the second outlet 55 into a first front panel outlet 55a and a second front panel outlet 55b. The first front panel outlet 55a fluidly couples the first side portion 41 of the second chamber 37 to one or more front panel vents (not shown) disposed within the passenger compartment of the motor vehicle. The second front panel outlet 55b fluidly couples the first side portion 41 of the second chamber 37 to one or more additional front panel vents of the motor vehicle also disposed within the passenger compartment of the motor vehicle. The front panel vents may be disposed within the passenger compartment in a configuration primarily directing the flow of the air towards a front passenger area of the passenger compartment due to the potential for the front driver side to be absent a passenger if an autonomous vehicle is employed.

A second control door 56 selectively controls the flow of the air exiting the mixing section 20 and flowing through the second outlet 55. In the embodiment shown, the second control door 56 includes a first front panel portion 56a for controlling the flow of the air through the first front panel outlet 55a and a second front panel portion 56b for controlling the flow of the air through the second front panel outlet 55b. The first front panel portion 56a and the second front panel portion 56b are each shown as being a dual-panel, but alternative arrangements may be used without departing from the scope of the present invention. A pivot axis 58 of the second control door 56 may be disposed in a central region of the second chamber 37 and at an intersection of the two panels forming the second control door 56.

The second control door 56 may alternatively be formed as a single paneled door or may be configured for controlling the flow of the air through a single opening forming the second outlet 55, as desired. If a single opening is used, the distribution of the flow of the air between the front panel vents of the motor vehicle may be determined by dividing structure disposed downstream of the second outlet 55, as desired. Alternative configurations may be used without departing from the scope of the present invention, as desired.

The second control door 56 is rotatably adjustable between a first position and a second position. The first position (not shown) includes the second control door 56 rotated to a position substantially closing off the flow of the air through each of the first front panel outlet 55a and the second front panel outlet 55b. The second position, which is illustrated in FIG. 3, includes the second control door 56 rotated to a position wherein a maximized amount of the air exiting the mixing section 20 is allowed to flow past each of the first front panel portion 56a and the second front panel portion 56b of the second control door 56 and through each of the first front panel outlet 55a and the second front panel outlet 55b of the second outlet 55. The second control door 56 is further adjustable to a plurality of positions intermediate the first position and the second position for selectively controlling the flow of the air flowing through the second outlet 55.

The first side portion 51 of the third chamber 39 is fluidly coupled to and disposed downstream of the first side portion 41 of the second chamber 37. The first side portion 51 of the third chamber 39 includes a third outlet 65 and a fourth outlet 75. The third outlet 65 fluidly couples the first side portion 51 of the third chamber 39 to one or more front floor vents (not shown) of the vehicle. The air handling system 10 may include one or more conduits (not shown) extending from the third outlet 65 for delivering the air to each of the front floor vents associated with the third outlet 65 for directing the air towards a floor of the front seat area of the vehicle. The fourth outlet 75 fluidly couples the first side portion 51 of the third chamber 39 to one or more rear floor vents (not shown) of the vehicle for directing the air towards a floor of the rear seat area of the vehicle. The air handling system 10 may include one or more conduits (not shown) extending from the fourth outlet 75 for delivering the air to each of the rear floor vents associated with the fourth outlet 75.

A third control door 66 is rotatably disposed at the inlet into the first side portion 51 of the third chamber 39 for selectively controlling the flow of the air through each of the third outlet 65 and the fourth outlet 75. The third control door 66 is illustrated as including a pivot axis 68 disposed adjacent the wall 7 and a single panel extending away from the pivot axis 68. However, alternative configurations may be used without departing from the scope of the present invention, including multiple panels and an axis of rotation spaced from the position shown in FIGS. 3 and 4.

The third control door 66 is rotatably adjustable between a first position and a second position. The first position (not shown) includes the third control door 66 rotated to a position substantially closing off the flow of the air through each of the third outlet 65 and the fourth outlet 75. The second position, which is illustrated in FIG. 3, includes the third control door 66 rotated to a position wherein a maximized amount of the air exiting the mixing section 20 is allowed to flow past the third control door 66 and through each of the third outlet 65 and the fourth outlet 75. The third control door 66 is further adjustable to a plurality of positions intermediate the first position and the second position for selectively controlling the flow of the air flowing through each of the third outlet 65 and the fourth outlet 75.

The second side portion 42 of the second chamber 37 is devoid of an outlet disposed along the common plane of each of the first outlet 45 and the second outlet 55. Instead, as best shown in FIGS. 4 and 5, an end of the dividing plate 72 extending into the second chamber 37 includes a cap 74 extending at least partially in the lateral direction of the dividing plate 72 towards the second side portion 42 of the second chamber 37 to cause the cap 74 to be angled with respect to the end of the dividing plate 72. The cap 74 forms a portion of an uppermost surface of the second side portion 42 of the second chamber 37 and aids in directing the flow of the air encountering the cap 74 away from the dividing plate 72 and towards an arcuate surface 71 formed adjacent the cap 74, wherein the arcuate surface 71 may be an interior portion of the main housing 12 forming a portion of the uppermost surface of the second side portion 42 of the second chamber 37, as desired. The arcuate surface 71 is shaped to direct any air encountering the uppermost surface of the second side portion 42 of the second chamber 37 towards the second side portion 52 of the third chamber 39, as best shown in FIG. 4. The inclusion of the arcuate surface 71 and the cap 74 causes the second side portion 42 of the second chamber 37 to be enclosed between a single inlet at a boundary between the second chamber 37 and the mixing section 20 and a single outlet at a boundary between the second chamber 37 and the third chamber 39. In contrast, the first side portion 41 of the second chamber 37 includes the second outlet 55 in addition to the outlet into the first side portion 51 of the third chamber 39.

The second side portion 52 of the third chamber 39 is fluidly coupled to and disposed downstream of the second side portion 42 of the second chamber 37. The second side portion 52 of the third chamber 39 includes a fifth outlet 85 fluidly coupling the second side portion 52 of the third chamber 39 to one or more rear panel vents (not shown) of the motor vehicle. As shown in FIG. 1, a conduit 90 may extend downwardly and toward the rear passenger area of the motor vehicle for delivering the flow of the air flowing through the fifth outlet 85 to the rear panel vents while minimizing a pressure drop experienced by the air flowing through the conduit 90.

A fourth control door 76 is pivotally disposed at the inlet to the second side portion 52 of the third chamber 39 for selectively controlling the flow of the air through the fifth outlet 85. The fourth control door 76 is illustrated as including a pivot axis 78 disposed adjacent the wall 7 and a single panel extending away from the pivot axis 78. Alternative configurations may be used without departing from the scope of the present invention, including multiple panels and a pivot axis spaced from the position shown in FIGS. 3 and 4.

The fourth control door 76 is rotatably adjustable between a first position and a second position. The first position (not shown) includes the fourth control door 76 pivoted to a position substantially closing off the flow of the air through the fifth outlet 85. The second position, which is illustrated in FIG. 4, includes the fourth control door 76 pivoted to a position wherein a maximized amount of the air exiting the mixing section 20 is allowed to flow past the fourth control door 76 and through the fifth outlet 85. The fourth control door 76 is further adjustable to a plurality of positions intermediate the first position and the second position for selectively controlling the flow of the air flowing through the fifth outlet 85.

Figure 6:
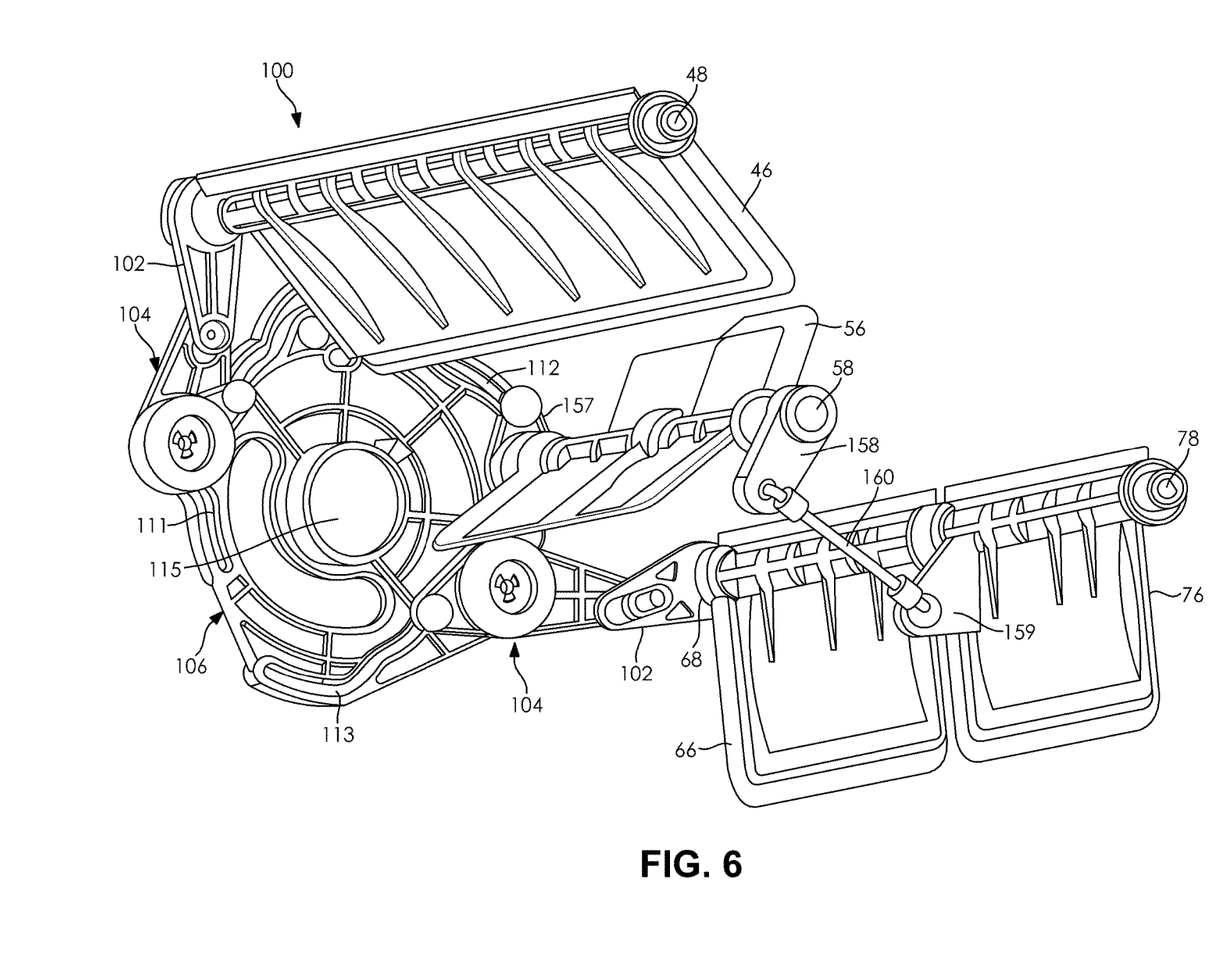
FIG. 6 is a perspective view of a kinematic system of the air handling system of FIGS. 1-5.
Figure 7:
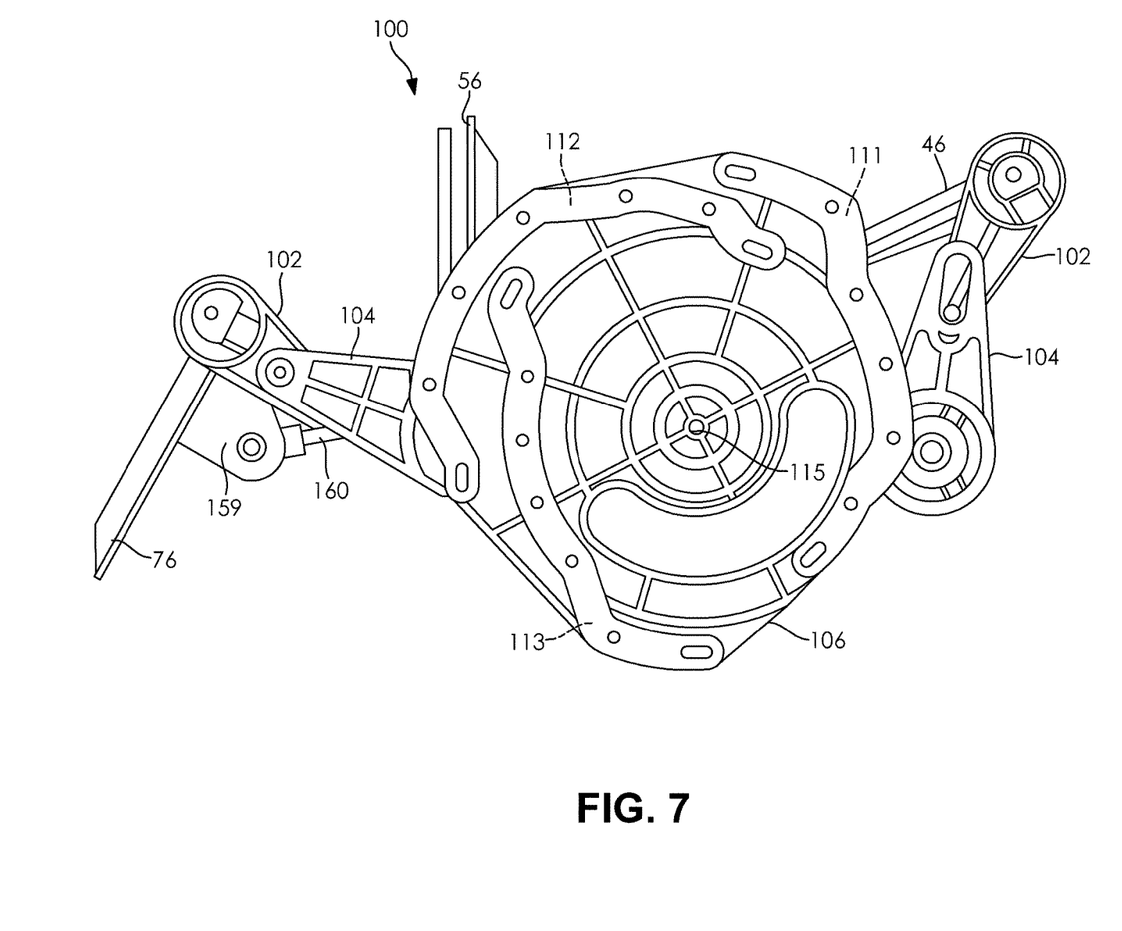
FIG. 7 is an elevational view of the kinematic system illustrated in FIG. 6.

Referring now to FIGS. 6 and 7, the air handling system 10 may include a kinematic system 100 for controlling the position of each of the control doors 46, 56, 66, 76. As explained hereinabove, the form and configuration of the control doors 46, 56, 66, 76 may vary without necessarily departing from the scope of the present invention, hence the kinematic system 100 illustrated in FIGS. 6 and 7 is merely one representative example of a suitable configuration for controlling each of the control doors 46, 56, 66, 76 simultaneously. The concepts employed in the formation of the kinematic system 100 are generally disclosed in U.S. Pat. Appl. Pub. No. 2017/0106722 to Nolta et al., which is hereby incorporated by reference in its entirety.

The kinematic system 100 includes a plurality of arms 102, a plurality of linkages 104, a cam plate 106, and an actuator 108 (shown in FIGS. 1 and 2 and omitted from FIGS. 6 and 7 for clarity). The arms 102 are fixed projections extending from one of the control doors 46, 56, 66, 76. Each of the arms 102 may include one or more slots, openings, or pins spaced from a pivot axis or an axis of rotation of the corresponding control door for mechanically interfacing with one or more of the linkages 104 or the cam plate 106. The linkages 104 form mechanical connectors for translating motion between the cam plate 106 and the control doors 46, 56, 66, 76 or between two or more of the control doors 46, 56, 66, 76. Each of the linkages 104 may include an independent pivot axis or axis of rotation and one or more slots, openings, or pins spaced from the axis of rotation for mechanically interfacing with the cam plate 106 or one or more of the arms 102 extending from the control doors 46, 56, 66, 76.

The cam plate 106 includes a first slot 111, a second slot 112, and a third slot 113. Each of the slots 111, 112, 113 is configured to receive one of the pins of one of the arms 102 or one of the pins of one of the linkages 104. The actuator 108 is configured to rotate the cam plate 106 about an axis of rotation 115 thereof. As best shown in FIG. 7, which illustrates the general shape of each of the slots 111, 112, 113 by showing a rear surface of the cam plate 106, each of the slots 111, 112, 113 includes at least one portion having a constant radius of curvature and at least one portion having a variable radius of curvature. This causes each of the slots 111, 112, 113 to include portions having a variable distance from the axis of rotation 115 of the cam plate 106. As the cam plate 106 is rotated about the axis of rotation 115 thereof, each of the pins received in one of the slots 111, 112, 113 is caused to move towards or away from the axis of rotation 115 when the shape of the corresponding slot 111, 112, 113 deviates from the constant radius of curvature. The movement of each pin causes the corresponding arm 102 or linkage 104 interacting with the cam plate 106 to pivot or rotate about the corresponding pivot axis or axis of rotation thereof. The pivoting or rotation is transferred directly or indirectly to each of the control doors 46, 56, 66, 76, thereby allowing for each of the control doors 46, 56, 66, 76 to be controlled using a single actuator 108.

As one representative example, a transfer of motion from the actuator 108 to the fourth control door 76 via the second control door 56 is described. The second control door 56 includes a first arm 157 extending from a first end thereof and a second arm 158 extending from a second end thereof. The fourth control door 76 includes a third arm 159 extending therefrom. A first linkage 160 includes a first end pivotally coupled to the second arm 158 of the second control door 56 and a second end pivotably coupled to the third arm 159 of the fourth control door 76. The first arm 157 includes a pin (not shown) rotatably and slidably received within the second slot 112 of the cam plate 106.

As the actuator 108 causes rotation of the cam plate 106 about the axis of rotation 115, the pin of the first arm 157 received in the second slot 112 is translated towards and away from the axis of rotation 115 of the cam plate 106 based on the shape of the second slot 112. The movement of the pin of the first arm 157 causes the second control door 56 to rotate about the pivot axis 58 thereof in unison with the pivoting of the first arm 157. The pivoting of the second control door 56 and the pivoting of the second arm 158 causes the first linkage 160 to push or pull the third arm 159 of the fourth control door 76, which in turn causes the fourth control door 76 to pivot about the pivot axis 78 thereof.

The second control door 56 and the fourth control door 76 may be mechanically linked wherein both control doors 56, 76 are simultaneously positioned in one of the fully closed position or the fully open position. As shown in FIGS. 3 and 4, a rotation of the second control door 56 away from the fully open second position towards the fully closed first position in a clockwise direction with respect to the perspective of FIGS. 3 and 4 causes the first linkage 160 to pull on the third arm 159 in a manner wherein the fourth control door 76 pivots away from the fully open second position towards the fully closed first position while also pivoting in the clockwise direction.

In other embodiments, the kinematic system 100 as shown in FIGS. 6 and 7 may be used in a manner to not simultaneously control each of the control doors 46, 56, 66, 76. Instead, one or more actuators (not shown) in addition to the actuator 108 may be employed for independently controlling one or more of the control doors 46, 56, 66, 76. In one representative example, the kinematic system 100 may be substantially identical to that shown in FIGS. 6 and 7 with the exception of the exclusion of the first linkage 160 extending between the second control door 56 and the fourth control door 76. Instead, the fourth control door 76 may include an independent actuator (not shown) configured to pivot the fourth control door 76 about the pivot axis 78 thereof independent of the motion of the actuator 108. In this respect, the control of the air to be delivered to the rear passenger area of the vehicle may be independent of the control of the air to be delivered to the remaining areas of the vehicle to allow for passengers in the rear seats of the vehicle to have independent control of the air directed toward the rear seats.

An additional benefit of the configuration of the air handling system 10 illustrated in FIGS. 1-7 includes the ability for existing air handling systems to be easily modified to include the features of the air handling system 10 allowing for the increased delivery of air to the rear seat area of the vehicle. Such existing air handling systems may include a pair of outlets disposed adjacent each other for delivering air to the front seat area of the vehicle in place of the single outlet 55 of the present air handling system 10, wherein the additional outlet is formed in a portion of the air handling system substantially corresponding to the position of the arcuate surface 71 and the cap 74 adjacent the second outlet 55 of the air handling system 10.

The flow configuration shown and described with respect to the air handling system 10 may accordingly be achieved by modification of such an existing air handling system. The modification primarily includes the addition or adaptation of the dividing plate 72 within the second chamber 37 and the third chamber 39 and the addition of the enclosing structure of the second side portion 42 of the second chamber 37 such as the cap 74 and the arcuate surface 71 in place of the aforementioned additional outlet. The presence of the dividing plate 72 ensures that approximately half of all of the air delivered to the second chamber 37 and the third chamber 39 from the mixing section 20 is delivered towards the second side portion 52 of the third chamber 39 including the fifth outlet 85, wherein the fifth outlet 85 fluidly couples the air handling system to the rear seat area of the vehicle.

The addition of the dividing plate 72 and the removal of the additional outlet directed towards the front seat area of the vehicle increases the distribution of air to the rear seat area of the vehicle without requiring a significant modification to the remainder of the existing air handling system. In this respect, existing air handling systems specifically suited for certain vehicles may be more easily modified to include the features disclosed herein if the existing vehicle is desired to be converted to an autonomous vehicle or a chauffeured vehicle. Similarly, the air handling system 10 shown and described may alternatively be better suited to replace the existing air handling system due to the air handling system 10 having substantially the same general configuration and positioning of various components thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system for a vehicle, the air handling system comprising:
   a conditioning section for controlling a temperature of a flow of air;
   a mixing section disposed downstream of the conditioning section with respect to a direction of the flow of the air; and
   a delivery section disposed downstream of the mixing section with respect to the direction of the flow of the air, the delivery section including a first chamber, a second chamber, and a third chamber, wherein a dividing plate separates each of the second chamber and the third chamber into a first side portion to a first side of the dividing plate and a second side portion to a second side of the dividing plate;
   wherein the edge of the dividing plate is positioned to cause a first portion of the flow of air exiting the mixing section and encountering the edge to flow to the first side portion of the second chamber and a second portion of the flow of the air exiting the mixing section and encountering the edge to flow to the second side portion of the second chamber;
   wherein the first side portion of the second chamber includes an outlet providing fluid communication between the first side portion of the second chamber and a front vent of the vehicle directing the flow of the air towards a front seat area of the vehicle; and
   wherein the second side portion of the second chamber is devoid of an outlet providing fluid communication between the second side portion of the second chamber and a front vent of the vehicle directing the flow of the air towards a front seat area of the vehicle.

2. The air handling system of claim 1, wherein an edge of the dividing plate extends to a boundary between the mixing section and the second chamber of the delivery section.

3. The air handling system of claim 1, wherein the second side portion of the second chamber is fluidly enclosed between a first boundary formed between the mixing section and the second side portion of the second chamber and a second boundary formed between the second side portion of the second chamber and the second side portion of the third chamber.

4. The air handling system of claim 3, wherein the second side portion of the second chamber is devoid of an outlet providing fluid communication between the mixing section and a passenger compartment of the vehicle intermediate the first boundary and the second boundary.

5. The air handling system of claim 1, wherein the second side portion of the second chamber includes a cap extending from the dividing plate and angled with respect to the dividing plate.

6. The air handling system of claim 5, wherein an arcuate surface adjacent the cap directs the flow of the air encountering the arcuate surface towards the second side portion of the third chamber.

7. The air handling system of claim 1, wherein the first chamber is disposed toward a front portion of the vehicle, the third chamber is disposed toward a rear portion of the vehicle, and the second chamber is disposed intermediate the first chamber and the third chamber.

8. The air handling system of claim 1, wherein the second side portion of the third chamber includes an outlet providing fluid communication between the second side portion of the third chamber and a rear vent of the vehicle directing the flow of the air towards a rear seat area of the vehicle.

9. The air handling system of claim 8, wherein a conduit extends between the outlet of the second side portion of the third chamber and the rear seat area of the vehicle.

10. The air handling system of claim 1, wherein the first chamber includes a first control door, the first side portion of the second chamber includes a second control door, the first side portion of the third chamber includes a third control door, and the second side portion of the third chamber includes a fourth control door.

11. The air handling system of claim 10, wherein the second control door selectively controls the flow of the air to a front vent directed toward a front seat area of the vehicle and the fourth control door selectively controls the flow of the air to a rear vent directed toward a rear seat area of the vehicle.

12. The air handling system of claim 11, wherein the second control door is mechanically linked to the fourth control door.

13. The air handling system of claim 12, wherein a repositioning of the second control door from a fully open position to a fully closed position causes a corresponding repositioning of the fourth control door from a fully open position to a fully closed position.

14. The air handling system of claim 11, wherein each of the first control door, the second control door, the third control door, and the fourth control door are mechanically linked to be selectively repositioned using a single actuator.

15. The air handling system of claim 10, wherein a first actuator controls a position of the second control door and a second actuator controls a position of the fourth control door.

16. The air handling system of claim 10, wherein the first control door selectively controls the flow of the air to at least one window vent of the vehicle for directing the air towards at least one window of the vehicle, the second control door selectively controls the flow of the air to at least one front panel vent of the vehicle for directing the air towards a front seat area of the vehicle, the third control door selectively controls the flow of the air to at least one floor vent of the vehicle for directing the air towards a floor area of the vehicle, and the fourth control door selectively controls the flow of the air to at least one rear vent of the vehicle for directing the air towards a rear seat area of the vehicle.

17. The air handling system of claim 1, wherein a majority of the flow of the air exiting the first side portion is directed towards a front seat area of the vehicle and a majority of the flow of the air exiting the second side portion is directed towards a rear seat area of the vehicle.

18. The air handling system of claim 1, wherein a portion of the flow of the air exiting the first side portion is directed towards a rear seat area of the vehicle and an entirety of the flow of the air exiting the second side portion is directed towards the rear seat area.

\* \* \* \* \*